(12) United States Patent
Zhao et al.

(10) Patent No.: US 8,203,997 B2
(45) Date of Patent: Jun. 19, 2012

(54) SYSTEM AND METHOD FOR MULTIPLE PACKET DATA NETWORK CONNECTIVITY DETACHMENT

(75) Inventors: Xiaoming Zhao, Irving, TX (US); Wei Wu, Irving, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 561 days.

(21) Appl. No.: 12/408,597

(22) Filed: Mar. 20, 2009

(65) Prior Publication Data

US 2009/0245177 A1   Oct. 1, 2009

Related U.S. Application Data

(60) Provisional application No. 61/040,536, filed on Mar. 28, 2008.

(51) Int. Cl.
*H04W 4/00* (2009.01)
(52) U.S. Cl. ........................................ 370/328
(58) Field of Classification Search ................ 370/328, 370/329, 338, 351, 356, 401, 402, 395.5, 370/395.52, 389; 709/228, 227
See application file for complete search history.

(56) References Cited

U.S. PATENT DOCUMENTS

| | | |
|---|---|---|
| 2002/0168984 A1 | 11/2002 | Wallentin |
| 2004/0179490 A1 | 9/2004 | Jang et al. |
| 2008/0320149 A1* | 12/2008 | Faccin ........................ 709/228 |

OTHER PUBLICATIONS

PCT International Search Report; PCT Application No. PCT/US2009/037872; Jun. 29, 2009; 4 pgs.
PCT Written Opinion of the International Searching Authority; PCT Application No. PCT/US2009/067872; Jun. 29, 2009; 7 pgs.
3GPP TS 23.401 V8.1.0; 3rd Generation Partnership Project; Technical Specification Group Services and System Aspects; General Packet Radio Service (GPRS) Enhancements for Evolved Universal Terrestrial Radio Access Network(E-UTRAN) Access; Release 8; Mar. 2008; 99 pgs. Part 1.
3GPP TS 23.401 V8.1.0; 3rd Generation Partnership Project; Technical Specification Group Services and System Aspects; General Packet Radio Service (GPRS) Enhancements for Evolved Universal Terrestrial Radio Access Network(E-UTRAN) Access; Release 8; Mar. 2008; 72 pgs. Part 2.
3GPP TS 23.402 V8.1.1; 3rd Generation Partnership Project; Technical Specification Group Services and System Aspects; Architecture Enhancements for non-3GPP Accesses; Release 8; Mar. 2008; 99 pgs. Part 1.
3GPP TS 23.402 V8.1.1; 3rd Generation Partnership Project; Technical Specification Group Services and System Aspects; Architecture Enhancements for non-3GPP Accesses; Release 8; Mar. 2008; 64 pgs. Part 2.
PCT International Preliminary Report on Patentability; PCT Application No. PCT/US2009/037872; Jun. 29, 2010; 12 pgs.
Zhao, Xiaoming, et al, U.S. Appl. No. 12/395,374, filed Feb. 27, 2009; Title: User Equipment Detach With Multiple Packet Data Network Connectivity.

\* cited by examiner

*Primary Examiner* — Chi Pham
*Assistant Examiner* — Alexander Boakye
(74) *Attorney, Agent, or Firm* — Conley Rose, P.C.; J. Robert Brown, Jr.

(57) ABSTRACT

A system is provided that includes a component configured to promote detachment of a user equipment (UE) from a plurality of packet data network (PDN) gateways by sending a message to the plurality of PDN gateways to detach multiple PDN connections associated with the UE.

19 Claims, 7 Drawing Sheets

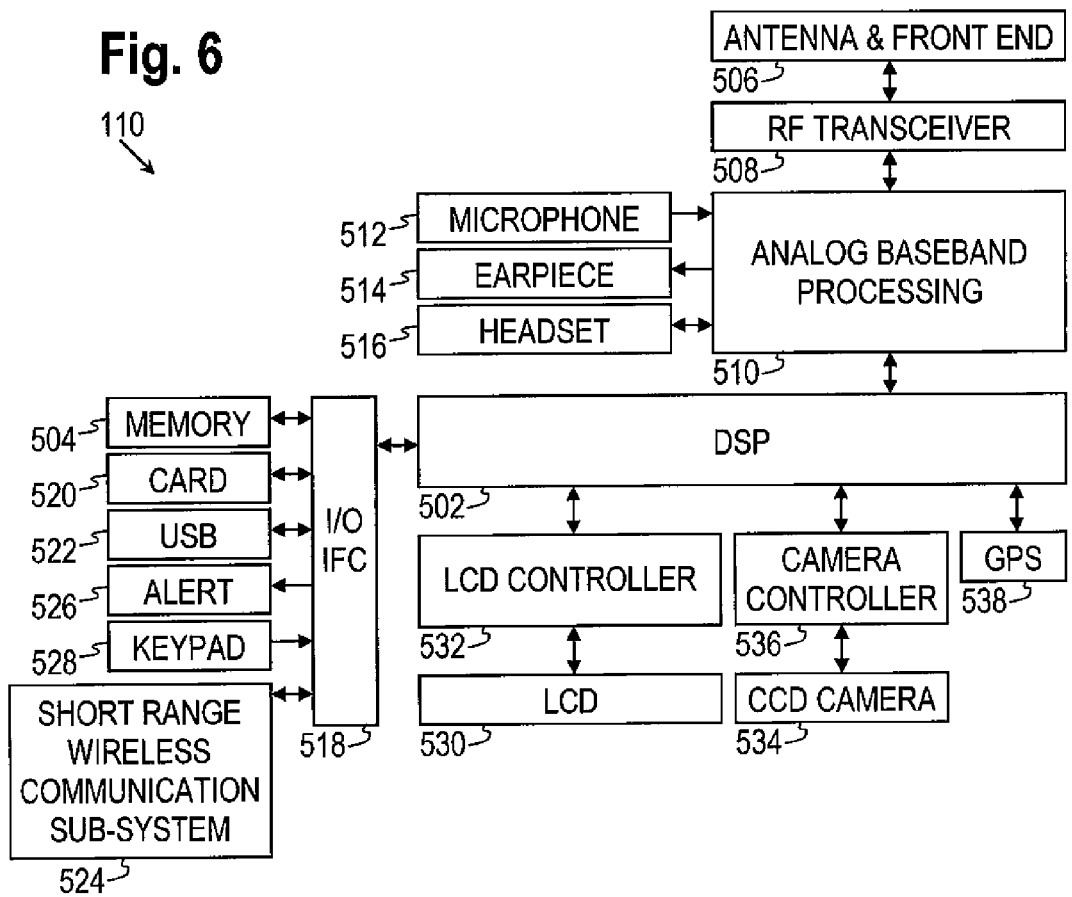
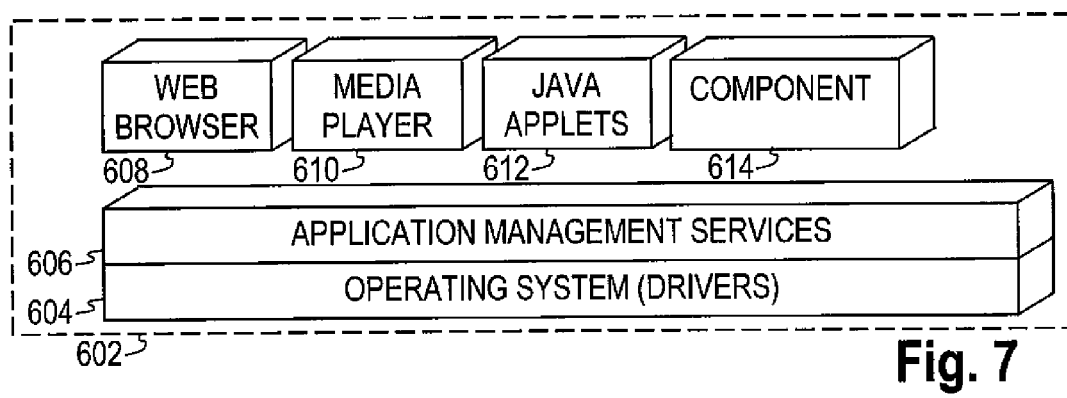

SYSTEM AND METHOD FOR MULTIPLE PACKET DATA NETWORK CONNECTIVITY DETACHMENT

CROSS-REFERENCE TO RELATED APPLICATIONS

The present application claims priority to U.S. Provisional Patent Application No. 61/040,536, filed Mar. 28, 2008, by Xiaoming Zhao, et al, entitled "Long Term Evolution User Equipment Detach with Multiple Packet Data Network Connectivity", which is incorporated by reference herein as if reproduced in its entirety.

BACKGROUND

Easily transportable devices with wireless telecommunications capabilities, such as mobile telephones, personal digital assistants, handheld computers, and similar devices, will be referred to herein as user equipment (UE). The term "UE" may refer to a device and its associated Universal Integrated Circuit Card (UICC) that includes a Subscriber Identity Module (SIM) application, a Universal Subscriber Identity Module (USIM) application, or a Removable User Identity Module (R-UIM) application or may refer to the device itself without such a card. The term "UE" may also refer to devices that have similar capabilities but that are not transportable, such as a desktop computer or a set-top box. A connection between a UE and some other element in a telecommunications network might promote a voice call, a file transfer, or some other type of data exchange, any of which can be referred to as a call or a session.

Some UEs communicate in a circuit switched mode, wherein a dedicated communication path exists between two devices. For the duration of a call or session, all data exchanged between the two devices travels along the single path. Some UEs have the capability to communicate in a packet switched mode, wherein a data stream representing a portion of a call or session is divided into packets that are given unique identifiers. The packets might then be transmitted from a source to a destination along different paths and might arrive at the destination at different times. Upon reaching the destination, the packets are reassembled into their original sequence based on the identifiers.

Communications that take place via circuit switching can be said to occur in the circuit switched domain and communications that take place via packet switching can be said to occur in the packet switched domain. Within each domain, several different types of networks, protocols, or technologies can be used. In some cases, the same network, protocol, or technology can be used in both domains. The wireless communication networks may be based on Code Division Multiple Access (CDMA), Time Division Multiple Access (TDMA), Frequency Division Multiple Access (FDMA), Orthogonal Frequency Division Multiplexing (OFDM), or some other multiple access scheme. A CDMA-based network may implement one or more standards such as 3GPP2 IS-2000 (commonly referred to as CDMA 1x), 3GPP2 IS-856 (commonly referred to as CDMA 1xEV-DO), or 3GPP UMTS (Universal Mobile Telecommunications System). The modes of access for UMTS are referred to as Universal Terrestrial Radio Access (UTRA). A TDMA-based network may implement one or more standards such as 3GPP Global System for Mobile Communications (GSM) or 3GPP General Packet Radio Service (GPRS).

GSM is an example of a wireless network standard that uses only the circuit switching mode. Examples of wireless network standards that use only packet switching include GPRS, CDMA 1x EV-DO, Worldwide Interoperability for Microwave Access (WiMax), and Wireless Local Area Network (WLAN), which might comply with Institute of Electrical and Electronics Engineers (IEEE) standards such as 802.16, 802.16e, 802.11a, 802.11b, 802.11g, 802.11n, and similar standards. Examples of wireless network standards that may use both circuit switching and packet switching modes include CDMA 1x and UMTS. The IP (Internet Protocol) Multimedia Subsystem (IMS) is a packet switched technology that allows multimedia content to be transmitted between UEs.

In traditional wireless telecommunications systems, transmission equipment in a base station transmits signals throughout a geographical region known as a cell. As technology has evolved, more advanced equipment has been introduced that can provide services that were not possible previously. This advanced equipment might include, for example, an enhanced node B (ENB) rather than a base station or other systems and devices that are more highly evolved than the equivalent equipment in a traditional wireless telecommunications system. As technology evolves, other access devices might be used to gain access to networks. These devices as well as conventional base stations and various types of radio access technologies may all be referred to herein as ENBs. Such advanced or next generation equipment may be referred to herein as long-term evolution (LTE) equipment, and a packet-based network that uses such equipment can be referred to as an evolved packet system (EPS).

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 6 is a block diagram of user equipment operable for some of the various embodiments of the disclosure.

FIG. 7 is a diagram of a software environment that may be implemented on user equipment operable for some of the various embodiments of the disclosure.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

According to one embodiment, a system is provided that includes a component configured to promote detachment of a user equipment (UE) from a plurality of packet data network (PDN) gateways by sending a message to the PDN gateways to detach multiple PDN connections associated with the UE.

In another embodiment, a method is provided for detaching user equipment (UE) from a plurality of packet data network (PDN) gateways. The method includes sending a message to the PDN gateways to detach multiple PDN connections associated with the UE. The method further includes sending a detach accept message after deactivation of all PDN connections associated with the UE.

Figure 1:
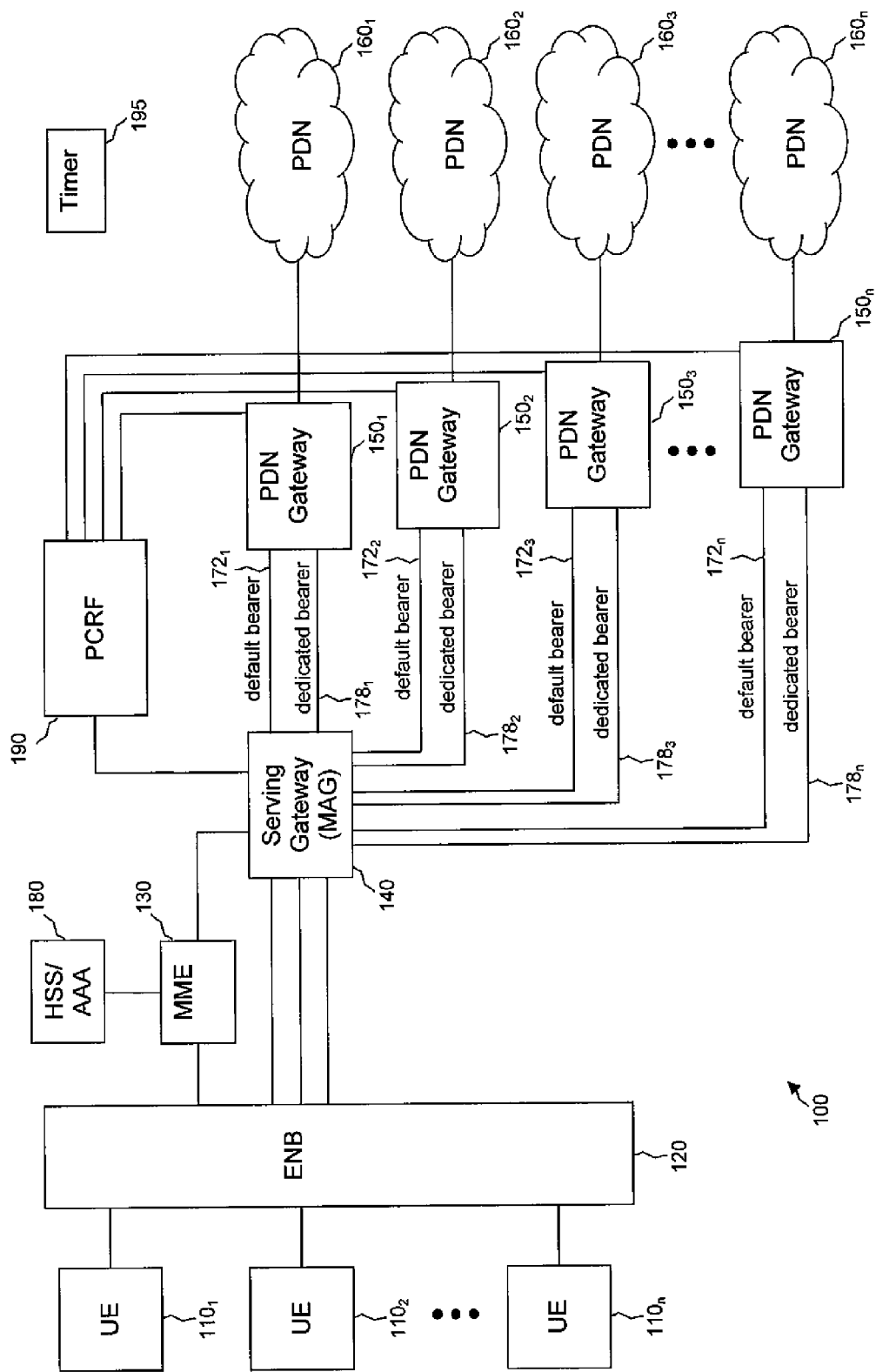
FIG. 1 is an illustration of a wireless telecommunications system according to an embodiment of the disclosure.

FIG. 1 illustrates an exemplary wireless telecommunications system 100 according to an embodiment of the disclosure. It should be noted that some of the lines connecting the components in FIG. 1 might represent bearer connections and some of the lines might represent signaling connections. Traditionally, different styles of lines are used to represent the different types of connections. However, for the sake of clarity in the drawing, the different types of connections in FIG. 1 are represented by the same style of line. Also, other connections that are not shown might exist between the components in FIG. 1.

The system 100 includes a plurality of UEs 110 each of which can connect to a plurality of packet data networks (PDNs) 160. The PDNs 160 might be Internet-based networks or might be other types of networks that can provide packet-based data. The PDNs 160 could also be considered to be access point names (APNs). Each PDN 160 can allow access to packet-based services, such as World Wide Web pages, multimedia broadcast/multicast services, and other data packet-based services. To access the PDNs 160, the UEs 110 might first establish one or more radio bearer connections with an ENB 120, a base station, a radio access technology, or a similar component. As mentioned previously, any such component will be referred to herein as the ENB 120. While only one ENB 120 is shown, multiple ENBs 120 could be present.

The UEs 110 may connect, via the ENB 120, to a serving gateway 140, which can also be referred to as a mobile access gateway (MAG). The serving gateway 140 terminates the user plane interface of the radio access portions of the system 100. The UEs 110 may also connect, via the ENB 120, to a mobility management entity (MME) 130, which then connects to the serving gateway 140. The MME 130 terminates the control plane interface of the radio access portions of the system 100. In practice, the MME 130 and the serving gateway 140 may be components in the same physical device, but they can be thought of as separate logical devices. Therefore, actions that are described herein in relation to one of these components might occur in relation to the other or to both of these components. Also, the device referred to as the MME 130 might, in a non-3GPP environment, be an access server or a similar component. Any such component will be referred to herein as the MME 130.

The serving gateway 140 forwards packets to the PDNs 160 via a plurality of PDN gateways 150. While each PDN gateway 150 is shown providing access to only one PDN 160, each PDN gateway 150 might provide access to a plurality of PDNs 160. The PDN gateways 150 might be other types of network gateways or similar components but will be referred to herein as the PDN gateways 150.

Multiple bearers may be established between the serving gateway 140 and each of the PDN gateways 150. An initial connection between one of the PDN gateways 150 and the serving gateway 140 is known as a default bearer 172 for that PDN gateway 150. The default bearer 172 is typically a non-guaranteed bit rate (non-GBR) connection so that "always on" connectivity can be supported.

After the default bearer 172 is connected to one of the PDN gateways 150, any additional connections that are made from the serving gateway 140 to that PDN gateway 150 are known as dedicated bearers 178. Based on the UEs' quality of service (QoS) profiles, the dedicated bearers 178 might conform to a set of QoS requirements, such as a guaranteed bit rate, a maximum bit rate, a packet delay budget, and other parameters of data transfer quality. In FIG. 1, only one dedicated bearer 178 connects each of the PDN gateways 150 to the serving gateway 140, but in other cases there could be no dedicated bearers 178 or multiple dedicated bearers 178 to each PDN gateway 150.

A home subscriber server (HSS), or an authentication/authorization accounting (AAA) server, or a similar component 180 can connect to the MME 130 and can store data related to services available to the UEs 110, billing policies for the UEs 110, and similar UE profile data. If dynamic policy and charge control (PCC) rules are deployed in the system 100, a policy control and charging rules function (PCRF) 190, or a similar component might be present. The PCRF 190 can connect to the serving gateway 140 and the PDN gateways 150 and can store policies related to the connections between the ENB 120 and the PDN gateways 150. While only one PCRF 190 is shown, multiple PCRFs 190 could be present, and each of the PDN gateways 150 could connect to more than one PCRF 190.

Some of the UEs 110 might connect to two or more PDN gateways 150 concurrently via the serving gateway 140. This could provide the UEs 110 with fast access to multiple PDNs 160. For example, one of the UEs 110 might connect to PDN $160_1$ in order to access the World Wide Web and might connect to PDN $160_2$ in order to access a video download. If concurrent bearers exist to both PDN gateway $150_1$ and PDN gateway $150_2$, the user could quickly switch between accessing PDN $160_1$ and PDN $160_2$. If concurrent bearers were not possible and the user wished to switch from PDN $160_1$ to PDN $160_2$, an existing bearer might need to be torn down and a new bearer established at the time access to PDN $160_2$ was attempted.

One of the UEs 110 that is connected to one of the PDN gateways 150 could be detached from the PDN gateway 150 under various circumstances. In a UE-initiated detach, the UE 110 informs the PDN gateway 150 to which it is connected that it no longer wishes to maintain the connection. The UE 110 then exchanges appropriate messages with the PDN gateway 150, possibly via one or more intermediary components, to cause the UE 110 to detach from the PDN gateway 150.

In a network-initiated detach, a component in the system 100 other than the UE 110 initiates the detachment of the UE 110 from the PDN gateway 150. For example, the MME 130 might detach the UE 110 as a result of the MME 130 not receiving a keep-alive response from the UE 110. Alternatively, the HSS/AAA 180 might detach the UE 110 based on a service expiring or being disallowed.

UE-initiated detaches are explicit, in that the UE 110 explicitly requests the detach and sends and receives signals to bring the detach about. Network-initiated detaches can be either explicit or implicit. In an explicit network-initiated detach, a component such as the MME 130 or the HSS/AAA 180 informs the UE 110 that the component is initiating a detach of the UE 110 and exchanges message related to the detach with the UE 110. In an implicit detach, a component such as the MME 130 or the HSS/AAA 180 initiates the detach without notifying the UE 110. Implicit detaches typically occur when it is presumed that communication with the UE 110 is not possible, such as when radio conditions are poor.

Embodiments of the present disclosure provide for the detachment of a UE that is concurrently connected to a plurality of PDN gateways 150. Procedures are provided for UE-initiated, MME-initiated, and HSS/AAA-initiated detaches from multiple PDN gateways.

Figure 2:
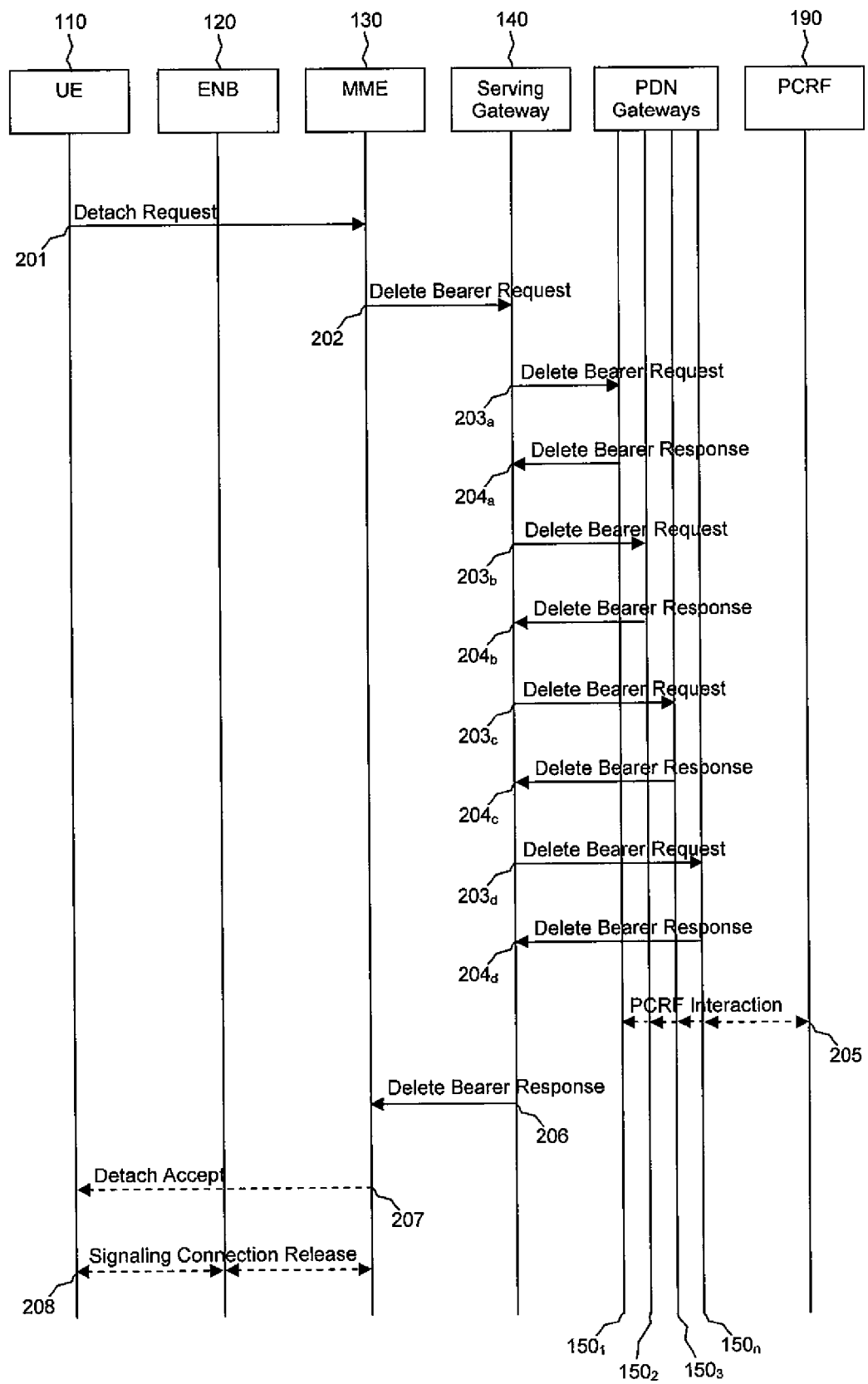
FIG. 2 is a call flow diagram for a UE-initiated detachment of a UE from a plurality of PDN gateways according to an embodiment of the disclosure.

FIG. 2 illustrates an embodiment of a call flow diagram for a UE-initiated detach of one of the UEs 110 from multiple PDN gateways 150. The PDN gateways 150 are depicted by lines labeled $150_1$, $150_2$, $150_3$, and $150_n$. At event 201, the UE 110 sends a Detach Request message to the MME 130. The message might include a "switch off" parameter that indicates whether the detach is due to a switch off situation. At event 202, the MME 130 sends a Delete Bearer Request message to the serving gateway 140, which deactivates the active bearers connecting the UE 110 to the serving gateway 140.

At events $203_a$, $203_b$, $203_c$, and $203_d$, the serving gateway 140 sends Delete Bearer Request messages to each of the PDN gateways $150_1$, $150_2$, $150_3$, and $150_n$, respectively, to which the UE 110 has active bearers. At events $204_a$, $204_b$, $204_c$, and $204_d$, each of the PDN gateways $150_1$, $150_2$, $150_3$, and $150_n$, respectively, acknowledges the Delete Bearer Request messages with Delete Bearer Response messages. The Request messages and the Response messages are shown occurring in an alternating manner, with one of the PDN gateways 150 sending a Response message before the serving gateway 140 sends a Request message to another PDN gateway 150, but the messaging does not necessarily occur in this manner. The serving gateway 140 might send Request messages to some or all of the PDN gateways 150 before receiving a Response message from one of the PDN gateways 150.

Also, as mentioned previously, the MME 130 and the serving gateway 140 may be components of the same physical device, even though they are depicted in FIG. 2 as separate components. Therefore, the messages exchanged at events 203 and 204 may be exchanged between the PDN gateways 150 and the serving gateway 140, as shown, or between the PDN gateways 150 and the MME 130 or a single component that includes both the MME 130 and the serving gateway 140.

At event 205, if one or more PCRFs 190 are deployed, the PDN gateways 150 might interact with the PCRFs 190 to indicate to the PCRFs 190 that the bearers are released. At event 206, the serving gateway 140 acknowledges the MME's Delete Bearer Request message with a Delete Bearer Response message to the MME 130. The serving gateway 140 acknowledges to the MME 130 with a Delete Bearer Response message only after receiving Delete Bearer Response messages from all of the PDN gateways 150. At event 207, if the "switch off" parameter indicates that the detach is not due to a switch off situation, the MME 130 sends a Detach Accept message to the UE 110. At event 208, the MME 130 releases its signaling connection with the UE 110 by sending a Release Command to the ENB 120 indicating that the cause for the release was a detach.

Figure 3:
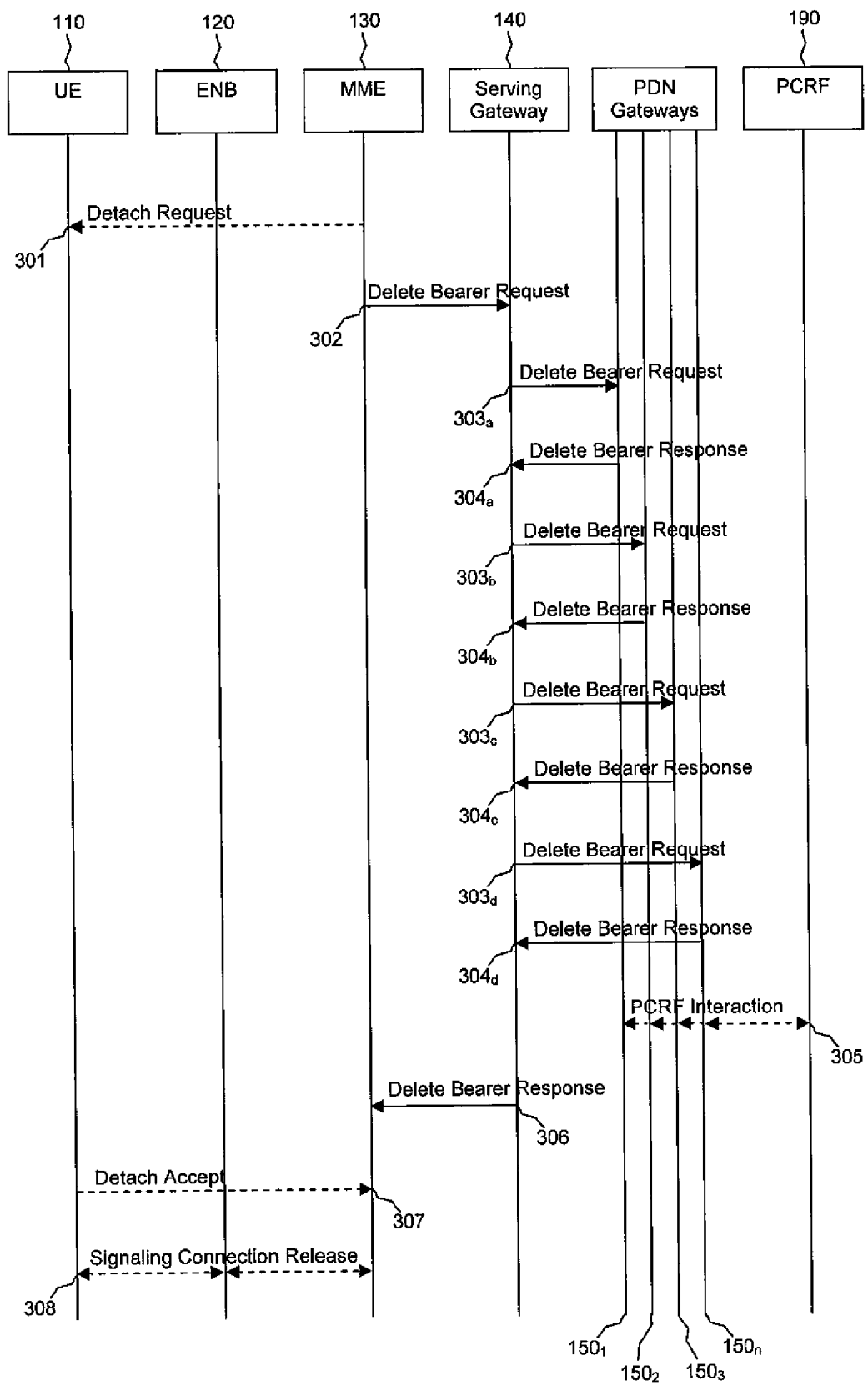
FIG. 3 is a call flow diagram for an MME-initiated detachment of a UE from a plurality of PDN gateways according to an embodiment of the disclosure.

FIG. 3 illustrates an embodiment of a call flow diagram for an MME-initiated detach of one of the UEs 110 from multiple PDN gateways 150. At event 301, depending on whether the MME-initiated detach is implicit or explicit, the MME 130 might send a Detach Request message to the UE 110. If the MME 130 has not had communication with the UE 110 for an extended period of time, the MME 130 may implicitly detach the UE 110. In this case, the MME 130 does not send a Detach Request message to the UE 110. If the MME 130 explicitly detaches the UE 110, the MME 130 does send a Detach Request message to the UE 110. The Detach Request message can contain a detach type, which might be set to "reattach", in which case the UE 110 reattaches at the end of the detach process. At event 302, the MME 130 sends a Delete Bearer Request message to the serving gateway 140, which deactivates the active bearers connecting the UE 110 to the serving gateway 140.

At events $303_a$, $303_b$, $303_c$, and $303_d$, the serving gateway 140 sends Delete Bearer Request messages to each of the PDN gateways $150_1$, $150_2$, $150_3$, and $150_n$, respectively, to which the UE 110 has active bearers. At events $304_a$, $304_b$, $304_c$, and $304_d$, each of the PDN gateways $150_1$, $150_2$, $150_3$, and $150_n$, respectively, acknowledges the Delete Bearer Request messages with Delete Bearer Response messages. The Response messages may be returned in a different sequence than Request messages were sent as opposed to the alternating sequence shown. Also, the messages exchanged at events 303 and 304 may be exchanged between the PDN gateways 150 and the serving gateway 140, the MME 130, or a single component that includes both the MME 130 and the serving gateway 140.

At event 305, if one or more PCRFs 190 are deployed, the PDN gateways 150 might interact with the PCRFs 190 to indicate to the PCRFs 190 that the bearers are released. At event 306, the serving gateway 140 acknowledges the MME's Delete Bearer Request message with a Delete Bearer Response message to the MME 130. The serving gateway 140 acknowledges to the MME 130 with a Delete Bearer Response message only after receiving Delete Bearer Response messages from all of the PDN gateways 150. At event 307, if the UE 110 received a Detach Request message from the MME 130 at event 301, the UE 110 sends a Detach Accept message to the MME 130. This event can occur any time after event 301. At event 308, after the MME 130 receives the Detach Accept message, if the detach type did not request the UE 110 to reattach, the MME 130 releases its signaling connection with the UE 110 by sending a Release Command to the ENB 120 indicating that the cause for the release was a detach.

Figure 4:
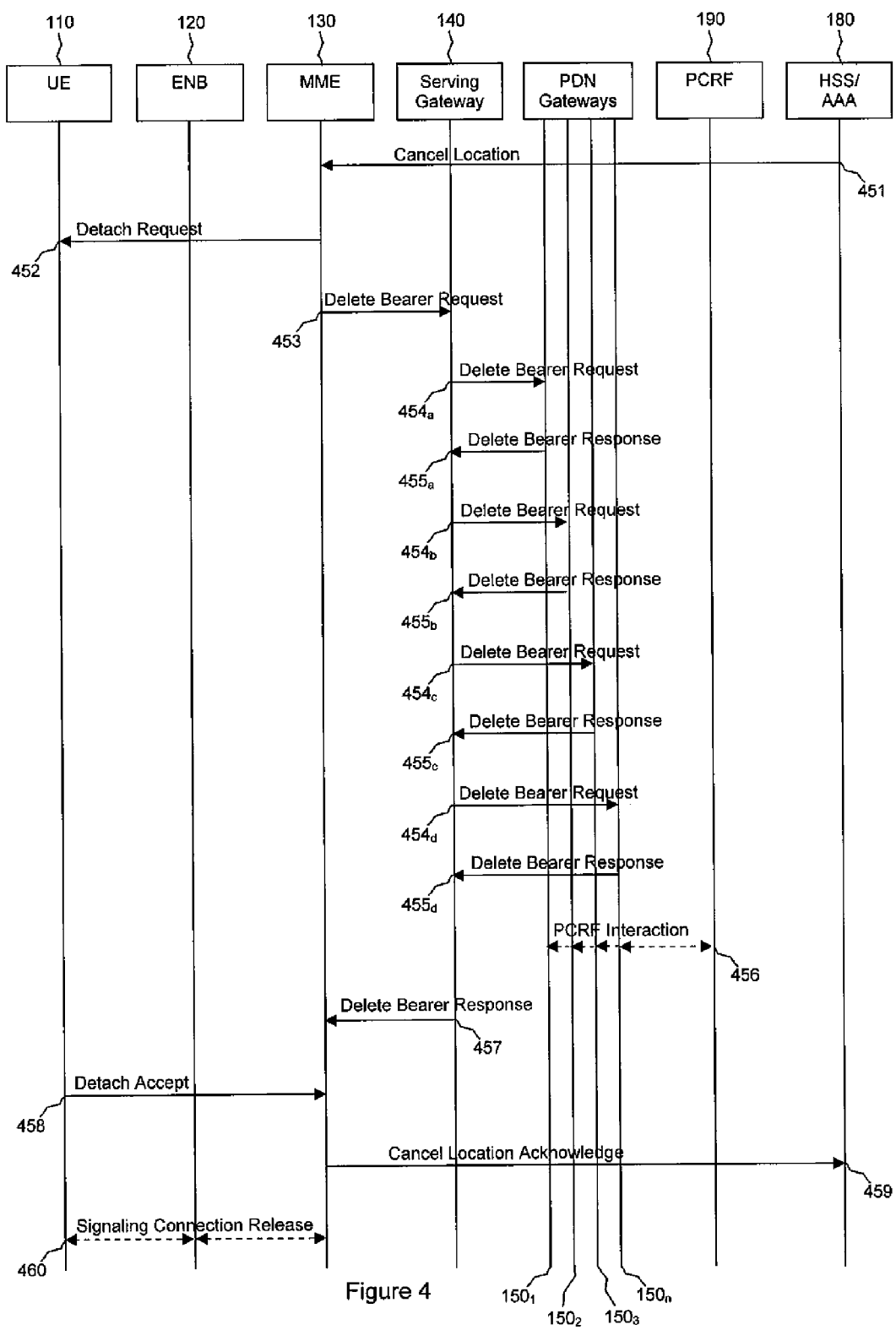
FIG. 4 is a call flow diagram for an HSS/AAA-initiated detachment of a UE from a plurality of PDN gateways according to an embodiment of the disclosure.

FIG. 4 illustrates an embodiment of a call flow diagram for an HSS/AAA-initiated detach of one of the UEs 110 from multiple PDN gateways 150. At event 451, if the HSS/AAA 180 wants to request the immediate deletion of a subscriber's bearers and mobility management contexts, the HSS/AAA 180 sends a Cancel Location message to the MME 130 with the cancellation type parameter set to "subscription withdrawn". At event 452, if the cancellation type is "subscription withdrawn", the MME 130 informs the UE 110 that the UE 110 has been detached by sending a Detach Request message to the UE 110. At event 453, the MME 130 sends a Delete Bearer Request message to the serving gateway 140, which deactivates the active bearers connecting the UE 110 to the serving gateway 140.

At events $454_a$, $454_b$, $454_c$, and $454_d$, the serving gateway 140 sends Delete Bearer Request messages to each of the PDN gateways $150_1$, $150_2$, $150_3$, and $150_n$, respectively, to which the UE 110 has active bearers. At events $455_a$, $455_b$, $455_c$, and $455_d$, each of the PDN gateways $150_1$, $150_2$, $150_3$, and $150_n$, respectively, acknowledges the Delete Bearer Request messages with Delete Bearer Response messages. Again, the Request messages and Response messages do not necessarily alternate, and these messages may be exchanged between the PDN gateways 150 and the serving gateway 140, the MME 130, or a single component that includes both the MME 130 and the serving gateway 140.

At event 456, if one or more PCRFs 190 are deployed, the PDN gateways 150 might interact with the PCRFs 190 to indicate to the PCRFs 190 that the bearers are released. At event 457, the serving gateway 140 acknowledges the MME's Delete Bearer Request message with a Delete Bearer Response message to the MME 130. The serving gateway 140 acknowledges to the MME 130 with a Delete Bearer Response message only after receiving Delete Bearer Response messages from all of the PDN gateways 150.

At event 458, if the UE 110 received a Detach Request message from the MME 130 at event 452, the UE 110 sends a Detach Accept message to the MME 130. This event can occur any time after event 452. At event 459, the MME 130 confirms the deletion of the bearers and the mobility management contexts by sending a Cancel Location Acknowledgement message to the HSS/AAA 180. At event 460, after the MME 130 receives the Detach Accept message, the MME 130 releases its signaling connection with the UE 110 by sending a Release Command to the ENB 120 indicating that the cause for the release was a detach. Events 452, 458, and 460, which involve the UE 110, might occur only when the cancellation type is set to "subscription withdrawn".

In any of the three types of detach discussed above, the serving gateway 140 might not receive Delete Bearer Response messages from all of the PDN gateways 150 to which the serving gateway 140 sent Delete Bearer Request messages. For example, the serving gateway 140 might send Delete Bearer Request messages to four PDN gateways 150 but might receive Delete Bearer Response messages from only three PDN gateways 150. When the serving gateway 140 does not receive a corresponding Delete Bearer Response message for each Delete Bearer Request message that it sends, a failure of the multi-PDN gateway detach procedure may be indicated.

In an embodiment, one of the components in the system 100 can include a timer 195 that can keep track of the time that has elapsed since the last Delete Bearer Request message was sent from the serving gateway 140 to the PDN gateways 150. If a pre-specified period of time elapses before the serving gateway 140 receives Delete Bearer Response messages from all of the PDN gateways 150 to which the serving gateway 140 sent Delete Bearer Request messages, the multiple-PDN gateway detach can be considered to have failed. When a detach failure occurs, the multiple-PDN gateway detach procedure can be restarted at any point before or including the point where the MME 130 sends the Delete Bearer Request message to the serving gateway 140.

Figure 5:
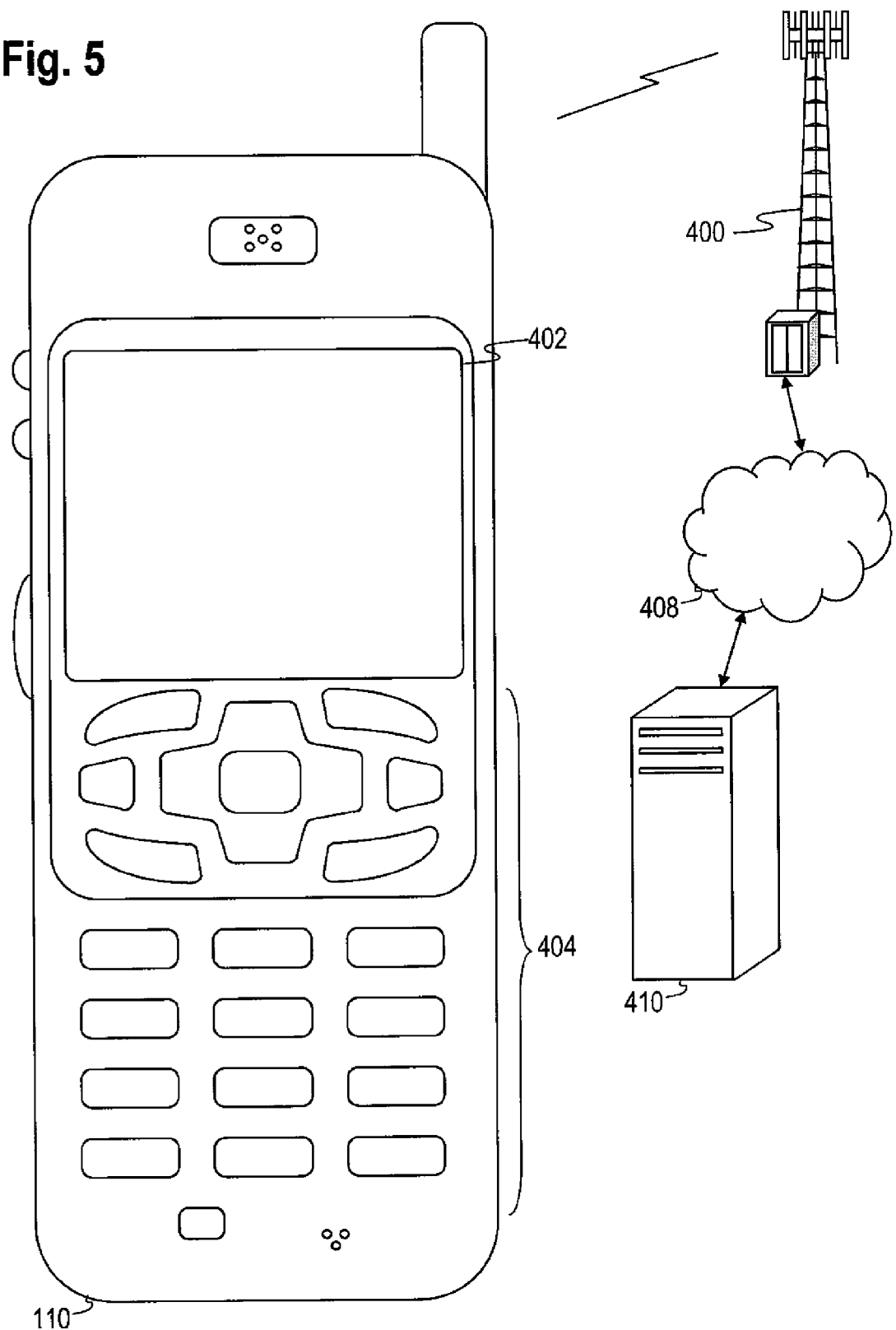
FIG. 5 is a diagram of a wireless communications system including user equipment operable for some of the various embodiments of the disclosure.

FIG. 5 illustrates a wireless communications system including an embodiment of the UE 110. The UE 110 is operable for implementing aspects of the disclosure, but the disclosure should not be limited to these implementations. Though illustrated as a mobile phone, the UE 110 may take various forms including a wireless handset, a pager, a personal digital assistant (PDA), a portable computer, a tablet computer, or a laptop computer. Many suitable devices combine some or all of these functions. In some embodiments of the disclosure, the UE 110 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UE 110 may be a portable, laptop or other computing device. The UE 110 may support specialized activities such as gaming, inventory control, job control, and/or task management functions, and so on.

The UE 110 includes a display 402. The UE 110 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 110 may present options for the user to select, controls for the user to actuate, and/or cursors or other indicators for the user to direct.

The UE 110 may further accept data entry from the user, including numbers to dial or various parameter values for configuring the operation of the UE 110. The UE 110 may further execute one or more software or firmware applications in response to user commands. These applications may configure the UE 110 to perform various customized functions in response to user interaction. Additionally, the UE 110 may be programmed and/or configured over-the-air, for example from a wireless base station, a wireless access point, or a peer UE 110.

Among the various applications executable by the UE 110 are a web browser, which enables the display 402 to show a web page. The web page may be obtained via wireless communications with a wireless network access node, a cell tower, a peer UE 110, or any other wireless communication network or system 400. The network 400 is coupled to a wired network 408, such as the Internet. Via the wireless link and the wired network, the UE 110 has access to information on various servers, such as a server 410. The server 410 may provide content that may be shown on the display 402. Alternately, the UE 110 may access the network 400 through a peer UE 110 acting as an intermediary, in a relay type or hop type of connection.

FIG. 6 shows a block diagram of the UE 110. While a variety of known components of UEs 110 are depicted, in an embodiment a subset of the listed components and/or additional components not listed may be included in the UE 110. The UE 110 includes a digital signal processor (DSP) 502 and a memory 504. As shown, the UE 110 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UE 110 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UE 110 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 110 to send and receive information from a cellular network or some other available wireless communications network or from a peer UE 110. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UE 110 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 110 and may also enable the UE 110 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 110 to communicate wirelessly with other nearby mobile devices and/or wireless base stations.

The input/output interface 518 may further connect the DSP 502 to the alert 526 that, when triggered, causes the UE 110 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UE 110. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UE 110 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UE 110 to determine its position. Various other peripherals may also be included to provide additional functions, e.g., radio and television reception.

FIG. 7 illustrates a software environment 602 that may be implemented by the DSP 502. The DSP 502 executes operating system drivers 604 that provide a platform from which the rest of the software operates. The operating system drivers 604 provide drivers for the UE hardware with standardized interfaces that are accessible to application software. The operating system drivers 604 include application management services ("AMS") 606 that transfer control between applications running on the UE 110. Also shown in FIG. 7 are a web browser application 608, a media player application 610, and Java applets 612. The web browser application 608 configures the UE 110 to operate as a web browser, allowing a user to enter information into forms and select links to retrieve and view web pages. The media player application 610 configures the UE 110 to retrieve and play audio or audiovisual media. The Java applets 612 configure the UE 110 to provide games, utilities, and other functionality. A component 614 might provide functionality related to UE detachment.

Figure 8:
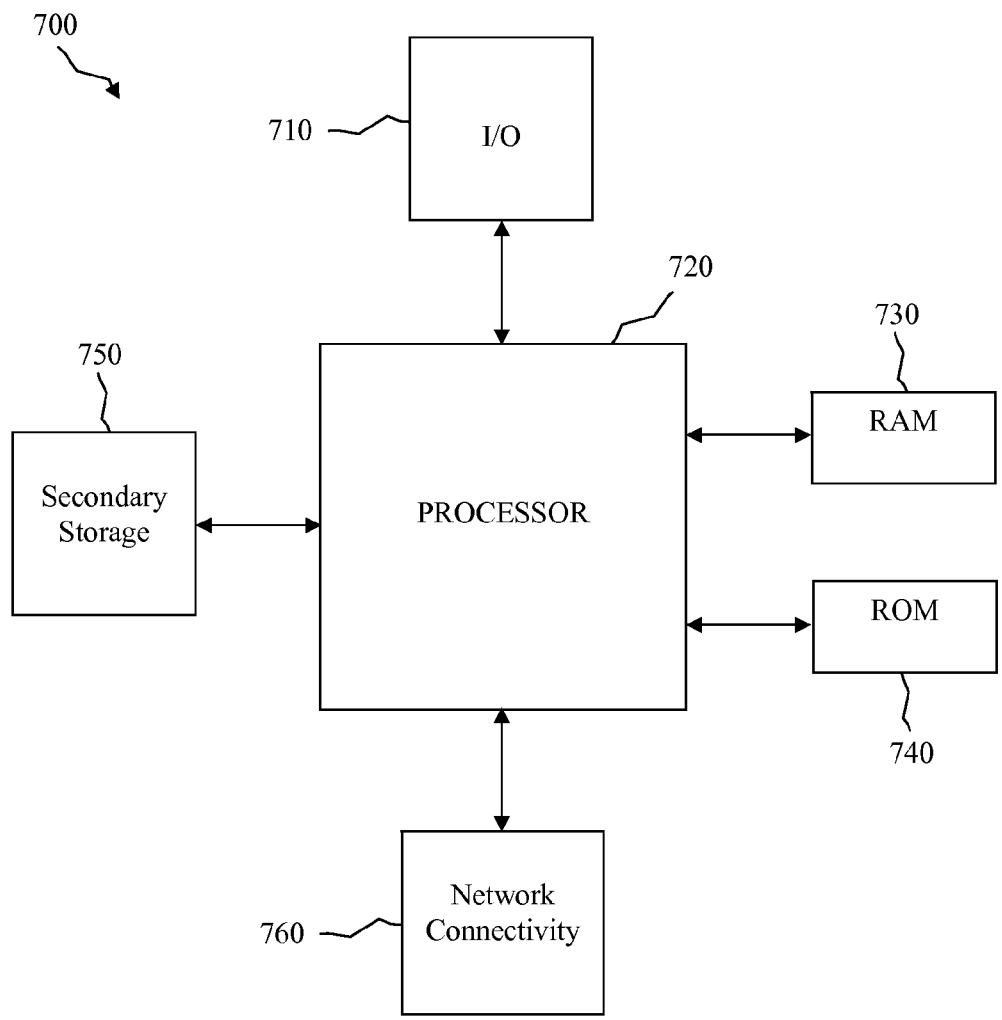
FIG. 8 is an illustrative general purpose computer system suitable for some of the various embodiments of the disclosure.

The UE 110 and other components of FIG. 1 may include any general-purpose computer with sufficient processing power, memory resources, and network throughput capability to handle the necessary workload placed upon it. FIG. 8 illustrates a typical, general-purpose computer system 700 that may be suitable for implementing one or more embodiments disclosed herein. The computer system 700 includes a processor 720 (which may be referred to as a central processor unit or CPU) that is in communication with memory devices including secondary storage 750, read only memory (ROM) 740, random access memory (RAM) 730, input/output (I/O) devices 710, and network connectivity devices 760. The processor may be implemented as one or more CPU chips.

The secondary storage 750 is typically comprised of one or more disk drives or tape drives and is used for non-volatile storage of data and as an over-flow data storage device if RAM 730 is not large enough to hold all working data. Secondary storage 750 may be used to store programs which are loaded into RAM 730 when such programs are selected for execution. The ROM 740 is used to store instructions and perhaps data which are read during program execution. ROM 740 is a non-volatile memory device which typically has a small memory capacity relative to the larger memory capacity of secondary storage. The RAM 730 is used to store volatile data and perhaps to store instructions. Access to both ROM 740 and RAM 730 is typically faster than to secondary storage 750.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 760 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 760 devices may enable the processor 720 to communicate with an Internet or one or more intranets. With such a network connection, it is contemplated that the processor 720 might receive information from the network, or might output information to the network in the course of performing the above-described method steps. Such information, which is often represented as a sequence of instructions to be executed using processor 720, may be received from and outputted to the network, for example, in the form of a computer data signal embodied in a carrier wave.

Such information, which may include data or instructions to be executed using processor 720 for example, may be received from and outputted to the network, for example, in the form of a computer data baseband signal or signal embodied in a carrier wave. The baseband signal or signal embodied in the carrier wave generated by the network connectivity 760 devices may propagate in or on the surface of electrical conductors, in coaxial cables, in waveguides, in optical media, for example optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 720 executes instructions, codes, computer programs, scripts which it accesses from hard disk, floppy disk, optical disk (these various disk-based systems may all be considered secondary storage 750), ROM 740, RAM 730, or the network connectivity devices 760. While only one processor 720 is shown, multiple processors may be present. Thus, while instructions may be discussed as executed by a processor, the instructions may be executed simultaneously, serially, or otherwise executed by one or multiple processors.

The following are incorporated herein by reference for all purposes: 3rd Generation Partnership Project (3GPP) Technical Specifications (TS) 23.401 for LTE UE 3GPP radio network accesses to the evolved packet core (EPC) and (TS) 23.402 for LTE UE non-3GPP network accesses. For the LTE UE non-3GPP accesses, the LTE UE multiple PDN detach procedures in an embodiment may involve different radio network access protocols and different network element entities.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for detaching a user equipment (UE) from a plurality of packet data network (PDN) gateways, comprising:
    sending a message to the PDN gateways to detach multiple PDN connections associated with the UE;
    sending a detach accept message after deactivation of all PDN connections associated with the UE; and
    restarting the detaching of the UE from the plurality of PDN gateways.

2. The method of claim 1, wherein the message is sent by one of:
- a mobility management entity;
- a serving gateway; and
- a component that includes the mobility management entity and the serving gateway.

3. The method of claim 1, wherein the detach is initiated by one of:
- the UE;
- a mobility management entity;
- a serving gateway;
- a component that includes the mobility management entity and the serving gateway; and
- a home subscriber server.

4. The method of claim 3, wherein, when the detach is initiated by the UE, the UE initiates the detach by sending a request for the detach to one of:
- the mobility management entity;
- the serving gateway; and
- the component that includes the mobility management entity and the serving gateway.

5. The method of claim 4, wherein one of the mobility management entity, the serving gateway, and the component that includes the mobility management entity and the serving gateway sends the detach accept message to the UE.

6. The method of claim 3, wherein, when the detach is initiated by one of the mobility management entity, the serving gateway, and the component that includes the mobility management entity and the serving gateway, one of the mobility management entity, the serving gateway, and the component that includes the mobility management entity and the serving gateway initiates the detach by one of:
- sending a request for the detach to the UE; and
- implicitly initiating the detach without informing the UE of the detach when communication with the UE is presumed to be lost.

7. The method of claim 6, wherein the UE sends the detach accept message to one of the mobility management entity, the serving gateway, and the component that includes the mobility management entity and the serving gateway.

8. The method of claim 3, wherein, when the detach is initiated by the home subscriber server, the home subscriber server initiates the detach by sending to one of the mobility management entity, the serving gateway, and the component that includes the mobility management entity and the serving gateway a message requesting deletion of bearer and a mobility management context associated with the UE.

9. The method of claim 8, wherein the UE sends the detach accept message to one of the mobility management entity, the serving gateway, and the component that includes the mobility management entity and the serving gateway.

10. The method of claim 1, wherein restarting the detachment of the UE only occurs when all of the PDN connections are not deactivated within a pre-specified time.

11. A device comprising: a component configured to promote detachment of a user equipment (UE) from a plurality of packet data network (PDN) gateways by sending a message to the PDN gateways to detach multiple PDN connections associated with the UE, wherein the component takes no further actions in the detachment of the UE, and wherein the device further comprises a timer configured to measure a time elapsed since a last one of a plurality of the messages was sent to the PDN gateways, and the device further configured, when all of the PDN gateways do not respond to the plurality of messages within a pre-specified time period after the last one of the plurality of messages was sent to the PDN gateways, to promote another attempt of the detachment of the UE from the plurality of PDN gateways.

12. The system device of claim 11, wherein, when the detachment is initiated by the UE, the UE initiates the detachment by sending a request for the detachment to one of:
- a mobility management entity;
- a serving gateway; and
- a component that includes the mobility management entity and the serving gateway.

13. The device of claim 12, wherein one of the mobility management entity, the serving gateway, and the component that includes the mobility management entity and the serving gateway sends a detach accept message to the UE after deactivation of all PDN connections associated with the UE.

14. The device of claim 11, wherein, when the detachment is initiated by one of a mobility management entity, a serving gateway, and a component that includes the mobility management entity and the serving gateway, one of the mobility management entity, the serving gateway, and the component that includes the mobility management entity and the serving gateway initiates the detachment by one of:
- sending a request for the detachment to the UE; and
- implicitly initiating the detachment without informing the UE of the detachment when communication with the UE is presumed to be lost.

15. The device of claim 14, wherein the UE sends a detach accept message to one of the mobility management entity, the serving gateway, and the component that includes the mobility management entity and the serving gateway after deactivation of all PDN connections associated with the UE.

16. The device of claim 11, wherein, when the detachment is initiated by a home subscriber server, the home subscriber server initiates the detachment by sending to one of a mobility management entity, a serving gateway, and a component that includes the mobility management entity and the serving gateway a message requesting deletion of a bearer and a mobility management context associated with the UE.

17. The device of claim 16, wherein the UE sends a detach accept message to one of the mobility management entity, the serving gateway, and the component that includes the mobility management entity and the serving gateway after deactivation of all PDN connections associated with the UE.

18. The device of claim 11, wherein the component is one of:
- a mobility management entity;
- a serving gateway; and
- a component that includes the mobility management entity and the serving gateway.

19. The device of claim 11, wherein the component taking no further actions in the detachment of the UE continues until all of the PDN gateways respond to the message.

* * * * *